T. S. BROWN,

Assignor of one-half interest to J. P. ADRIANCE.

Horse Rake.

No. 9,505. Reissued Dec. 21, 1880.

Thomas S. Brown

*Inventor,*

By his Attorneys

W. C. Strawbridge,

J. Bonsall Taylor

*Attests:*

John Dolley Jr

Owen Darcy Jr

N. PETERS, PHOTO-LITHOGRAPHER, WASHINGTON, D. C.

UNITED STATES PATENT OFFICE.

THOMAS S. BROWN, OF POUGHKEEPSIE, NEW YORK, ASSIGNOR OF ONE-HALF TO JOHN P. ADRIANCE.

HORSE-RAKE.

SPECIFICATION forming part of Reissued Letters Patent No. 9,505, dated December 21, 1880.

Original No. 174,113, dated February 29, 1876. Application for reissue filed January 18, 1879.

*To all whom it may concern:*

Be it known that I, THOMAS S. BROWN, of Poughkeepsie, in the county of Dutchess and State of New York, have invented a new and useful Improvement in Horse Hay-Rakes, of which the following is a specification.

Figure 1:
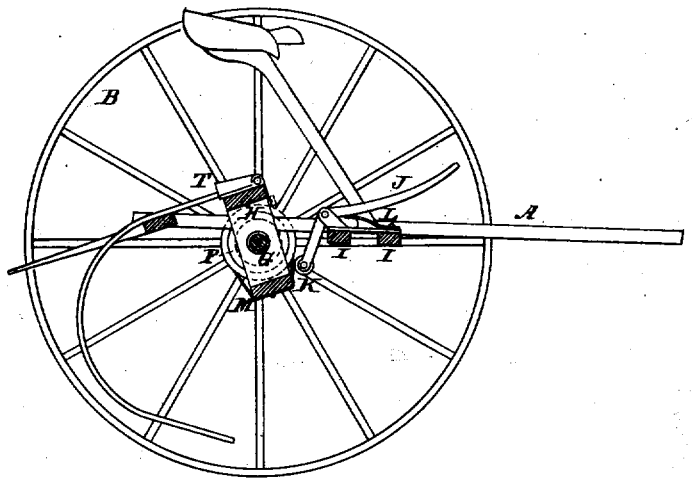
Figure 2:
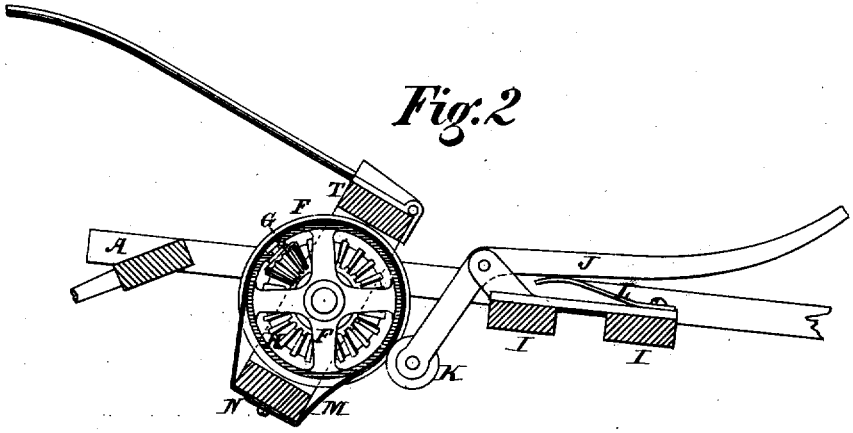

Figure 1 is a sectional side elevation of my rake; Fig. 2, a partial side section of the band-wheel, friction-roller lever, and differential gearing; and Fig. 3 a central longitudinal section of the same.

The same letters denote the same parts in all the figures.

My invention consists, substantially, in the devices hereinafter described and claimed. The construction of those devices is as follows:

A is the shafts, B the wheels, and C the centrally-divided axle set in bearings upon the shafts, to the outer extremities of which the wheels are keyed.

E E are bevel cog-wheels, keyed to the inner ends of the divided axle and facing toward one another.

Figure 3:
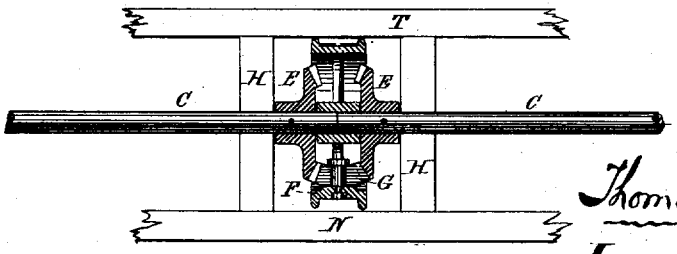

F is a flanged band-wheel, free to rotate upon the innermost extremities of both halves of the axle. Upon the inner side of the periphery of this band-wheel, and pivoted to it, is a pinion, G, which engages with both bevel-wheels, as shown in Fig. 3, the whole device forming a differential gearing for the wheels.

Pivoted upon the axle, and free, under ordinary circumstances, to oscillate about it, is a rectangular rake-head frame-work, H, the upper cross-piece of which, T, carries the rake-teeth.

Located and fulcrumed upon cross-braces I set upon the shafts, and directly in front of the band-wheel, is the friction-roller lever J, carrying at its lower bent extremity the friction-roller K.

L is a spring, which ordinarily keeps the foot-piece of the lever elevated, and the roller consequently away from the band-wheel.

Surrounding the flanged band-wheel loosely is a band, M, of leather, gum, metal, or other suitable material, attached to the lower cross-piece, N, of the frame-work H.

Such being the construction of my device, its mode of operation is as follows: When driven forward in a straight line, the force and speed from each road-wheel upon the bevel-wheels being the same, the pinion is held stationary, with reference to its own axis, between the bevel-wheels, and by them is carried around, consequently rotating with it the band-wheel, which slips readily over its band. In this position the rake-teeth are down and raking. The axis of oscillation of the rake-head frame-work is coincident with the axis of revolution of the axles and road-wheels, and rotation of the rakes is effected without the employment of intermediate mechanism between the axles and rake-head.

When it is desired to lift the teeth the foot of the driver depresses the foot-lever, brings the friction-roller in hard contact with the band, whereby the band-wheel itself is clutched by the band, and the band, with its attached frame-work H and rake-teeth, oscillated forward upon the axle in the direction of and by the band-wheel as the rake advances. The rake-head frame-work, in its forward revolution, or the portion T thereof which carries the teeth, encounters the end of the lever J behind its fulcrum, so as to react against the force applied by the foot, thus preventing at such stage of its movement any more friction than enough to keep the rake-head lifted, the band at such stage of the action slipping over the band-wheel, whereby the driver is enabled to carry the rake a greater or less distance before dropping it. The friction-band, while thus clutched between the band-wheel and friction-roller, slides over the band-wheel, which rotates under it. When the foot is removed from the lever the rake drops by its weight. When the rake is turned around the differential gearing allows free play to both wheels without shock or strain, the power being always divided between them in exact proportion to their relative speed.

The foot-lever is secured permanently upon the thill frame-work, being fulcrumed upon the cross-brace I, the advantage of which arrangement is that it does not necessitate that the operator should follow the motion of the lever, as is necessary when the latter is fulcrumed upon the rake-head and revolves with it.

The principal advantages of a rake of the class and construction herein described are that the rake is operated to discharge its load by an easy and uniform pressure upon the operating device without a straining effort, to which are added the advantages of a central application of power between the wheels and simultaneous action of the wheels, producing a steady movement of the machine; further, that the center of oscillation of the rake-head frame-work H is coincident with the center of the axles and road-wheels, and rotation of the rake is had without the employment of intermediate mechanism between the axles and rake-head other than the friction-band M and band-wheel F above described; further, that such construction admits of the bringing of the rake-teeth within the periphery of the road-wheels, their points being in approximate line with the points of traction of the road-wheels, the wheels thus preventing the hay from stringing out at the sides of the rakes, while the teeth themselves are not in danger of being bent sidewise in turning or driving in curves, as they are when in the rear of the points of traction; further, that the load, being directly beneath, the rake can be turned with greater ease than when carried at the rear, the tread of the wheels being the turning fulcrum.

Having thus described my invention, I claim and desire to secure by Letters Patent of the United States—

1. In a horse hay-rake, the combination, with parts of a divided axle rotating permanently with each traveling wheel, of a controllable friction dumping device acted upon by each wheel in its forward movement, and a lever for causing said friction device to bite the rotating surface at will.

2. The combination of a friction device and a divided axle having the wheels rigidly affixed thereto.

3. A horse hay-rake with a divided axle with the wheels fixedly attached thereto, and having the axle and rake-head adapted to be locked together, and having the axis of oscillation of the rake coincident with the axis of revolution of the axle, substantially as set forth.

4. In a horse hay-rake, the combination of a friction device with the axle and rake-head, for the purpose of locking the two latter together, and a lever for actuating said friction device, all arranged so that when pressure is applied to said lever, and the rake-head and axle are locked together and the rake-head is revolved, said rake-head or an attachment thereof shall, in its revolution, strike said lever below or behind its fulcrum and counteract the force applied by the operator to the other end of the lever, for the purpose set forth.

5. The combination of a friction device with the divided axle and rake-head, for the purpose of locking them together, and a stationary lever permanently located on the thill frame-work for actuating said friction device.

6. The combination of the divided axle C, the bevel-wheels E E, the pinion G, the band-wheel F, the band M, the frame-work H, and the friction-roller lever J and roller K, the whole forming a differentially-geared lifting and dropping device for horse hay-rakes, substantially as described.

7. The friction-roller lever J and its roller K, in combination with the frame-work H, the band-wheel F, and band M, the whole forming a lifting and dropping device for horse-rakes, as described.

8. In a horse hay-rake, the combination of the rake-head H with the friction-lever J in such manner that said rake-head, in its revolution, strikes said lever below or behind the fulcrum thereof, for the purpose specified.

In testimony whereof I have hereunto signed my name this 10th day of January, A. D. 1879.

THOS. S. BROWN.

Witnesses:
A. M. RUNDIN,
JOHN E. ADRIANCE.